US012542777B2

(12) United States Patent
Wattiau et al.

(10) Patent No.: US 12,542,777 B2
(45) Date of Patent: Feb. 3, 2026

(54) REMOTE CLUSTER ENROLLMENT

(71) Applicant: Hewlett-Packard Development Company, L.P., Spring, TX (US)

(72) Inventors: Gaetan Wattiau, Bristol (GB); Joshua Serratelli Schiffman, Washington, DC (US); Adrian John Baldwin, Bristol (GB); Derek Lukasik, Fort Collins, CO (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 289 days.

(21) Appl. No.: 18/180,744

(22) Filed: Mar. 8, 2023

(65) Prior Publication Data
US 2024/0305634 A1 Sep. 12, 2024

(51) Int. Cl.
*H04L 9/40* (2022.01)
(52) U.S. Cl.
CPC .......... *H04L 63/0876* (2013.01); *H04L 63/20* (2013.01)

(58) Field of Classification Search
CPC .......................... H04L 63/0876; H04L 63/20
See application file for complete search history.

(56) References Cited

U.S. PATENT DOCUMENTS

| | | | |
|---|---|---|---|
| 10,749,870 B2 | 8/2020 | Brouillette et al. | |
| 10,887,733 B2 | 1/2021 | Rykowski et al. | |
| 2015/0350211 A1* | 12/2015 | Burgess | H04L 63/10 726/30 |
| 2016/0149930 A1* | 5/2016 | Casaburi | H04L 63/1425 726/1 |
| 2018/0234816 A1* | 8/2018 | Rykowski | H04L 63/105 |
| 2019/0149405 A1 | 5/2019 | Verma et al. | |
| 2020/0098250 A1* | 3/2020 | Satou | G08B 29/188 |
| 2021/0029162 A1 | 1/2021 | Pan et al. | |
| 2021/0390959 A1* | 12/2021 | Jain | A61B 5/7267 |
| 2023/0319112 A1* | 10/2023 | Kaimal | H04L 63/20 726/1 |

* cited by examiner

*Primary Examiner* — Khoi V Le
(74) *Attorney, Agent, or Firm* — Quarles & Brady LLP

(57) ABSTRACT

A cluster enrollment system remote to a device cluster performs a cluster enrollment process according to a cluster enrollment policy to determine whether a target device is authenticated to join the device cluster.

19 Claims, 3 Drawing Sheets

REMOTE CLUSTER ENROLLMENT

BACKGROUND

A device that is added to a network, such as a network of devices at a particular location (e.g., business, residence, building, etc.), may require enrollment into a device cluster. The devices may be authenticated by an administrate that provides credentials on the device at the location.

DETAILED DESCRIPTION

Management of a cluster of devices (e.g., workstations or mobile device) at a business site, for example, may involve periodic replacement, upgrade, and/or supplementation of devices to the cluster. When a new device is added to the cluster, a trusted administrator may be required to be at the business site to provide authentication credentials to allow the new device to join the cluster. Especially if the trusted administrator is located remote to the business site (e.g., in a different building, city, state, etc.), requiring physical presence of the administrator at the business site for every device joining the cluster is onerous and time-consuming.

As disclosed herein, a target device that is added to a network, such as a network of devices at a particular business, may be enrolled into a network cluster without an administrator's physical presence at the location. The target device may initiate an authentication process with an enrollment authority, such as a cluster enrollment system, on the network to request access to a cluster. The enrollment authority may then determine an enrollment policy that is usable to determine whether the target device should be joined to the cluster. For example, in response to satisfaction of an enrollment policy, which may include one or more enrollment criteria, the target device may be provided with a key that allows the target device to join the cluster and engage in communication with other devices in the cluster and/or other devices outside of the cluster.

An enrollment policy generally seek to determine whether the target device is associated with the appropriate entity (e.g., a particular customer that purchased the device), is located at the appropriate location (e.g., a geographic location), has an appropriate platform configuration (e.g., a particular operating system, hardware specifications, installed software applications, etc.), and/or other factors that increase the likelihood that the device should be properly joined to the device cluster.

One example implementation might include a network at a restaurant or other retailer, for example, that uses multiple devices operated by multiple different individuals (e.g., shift employees that use the same devices). The devices may be joined to a device cluster to enable communication between the devices or with other secure resources of the restaurant. When a new device (referred to herein as a "target device") is added to the network, the target device may be automatically added to an appropriate cluster without the need for an administrator or IT specialist to provide authentication credentials, install the appropriate software, etc.

Example System and Environment

Figure 1:
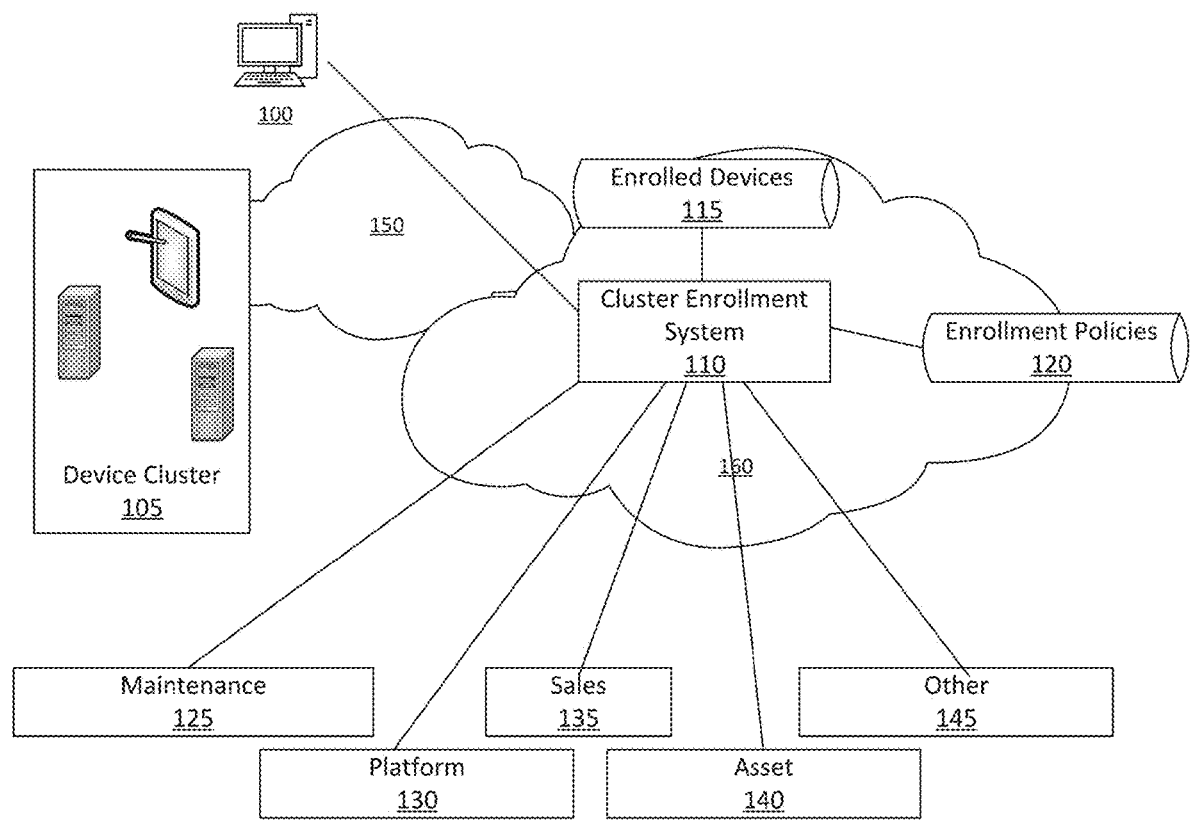
FIG. 1 is a block diagram illustrating one example of a network environment in which a cluster enrollment system is in communication with various systems and devices to coordinate a cluster enrollment process.

FIG. 1 is a block diagram illustrating one example of a network environment in which a cluster enrollment system 110 (also referred to herein as simply the "system 110") is in communication with various systems and devices to coordinate a cluster enrollment process. The system 110 may include a computing device, such as a server, workstation, cloud computing resource, and/or other device(s) with computer processing capabilities.

In the example of FIG. 1, a device cluster 105 includes multiple devices that have already been added to a network cluster, which may include a trusted group of devices that are granted access to certain resources of a business. In the example of FIG. 1, a target device 100 has been coupled to a network 150 and initiates a cluster enrollment process with an enrollment request to the cluster enrollment system 110. The network 150 may be a local area network associated with an entity, such as at a particular geographic location where each of the devices in the device cluster 105 are positioned and are able to access shared resources.

When the target device 100 is connected to the network 150, a communication channel with the cluster enrollment system 110 (which may be remote to the network 150, such as in a cloud configuration, or may be in direct communication with the network 150) is established and a cluster enrollment process is automatically performed. As discussed elsewhere herein, this process may be completed without user involvement at the target device 100, such as without an administrator providing authentication credentials directly into the target device 100 to authenticate the target device 100 to join the device cluster 105. When a target device joins a cluster, the device is provisioned with an identity to authenticate to privilege services and/or resources such as the cluster secret store, internal APIs, etc.

In the example of FIG. 1, the cluster enrollment system 110 may communicate with various external devices and data sources as part of a cluster enrollment process (which may result in the target device 100 either being joined to the device cluster 105 or denied access to the device cluster 105). In this example, the cluster enrollment system 110 accesses an enrollment policies data store 120 (also referred to herein as "enrollment policies") storing an enrollment policy associated with the device cluster 105 that indicates criteria and/or conditions (generally referred to as enrolment "criteria") for addition of new devices to the device cluster 105. Thus, in this example, the cluster enrollment system 110 may access the enrollment policies 120 in response to connection of the target device 100 to the network 150. The enrollment policies 120 may include different enrollment criteria for each of multiple cluster associated with an entity or for multiple entities.

In some examples, the enrollment policies 120 may be manually and/or automatically updated, such as by a security administrator of the entity (e.g., business). An enrollment policy may include various types or arrangements of criteria, such as criteria that are associated with an entity (e.g., to confirm the entity that purchased the device), a location (e.g., a geographic location), a configuration (e.g., a particular operating system, hardware specifications, installed software applications, etc.), and/or other factors that increase the likelihood that the target device should be authenticated to join the device cluster. The criteria of an enrollment policy may be specific to a particular target device, multiple target devices, or more generally to characteristics of any target devices.

The cluster enrollment system 110 may apply the appropriate enrollment policy (from the enrollment policies data store 120) in conjunction with acceptable attributes of the target device that are accessed from one or more external data systems, such as the example maintenance management system 125 (e.g., a system that stores information regarding service requests or trouble tickets that may be indicative of a new or replacement device entering the cluster), platform certification system 130 (e.g., a system that stores information regarding hardware, software, firmware, etc. of devices), sales system 135, asset management system 140, and/or other system(s) 145. For example, the enrollment policy associated with the device cluster 105 may include a platform policy indicating a particular manufacturer of the target device 100, a platform policy indicating platform criterion (e.g., processor speed, memory, display characteristics, etc.), device identifier, environmental attributes, and/or other enrollment criteria that are discussed herein.

In some examples, if the target device 100 is successfully authenticated by the cluster enrollment system 110, a token is provided to the target device 100 that allows the target device to join the device cluster 105. One example implementation may use TPM (Trusted Platform Module) authentication that provides hardware-based security. TPM typically uses asymmetric (public/private) keys that are generated within the TPM and that are only usable within the TPM chip, which may be integrated into the motherboard of the system. The keys would often be signing keys such that when the device (or associated user) wants to authenticate with a service, the device will have registered the public key with the service. The service will send a nonce to challenge the device. The device will make a request to the TPM to sign the nonce and prove it is the owner of the private key. The signed response will be sent back to the service. A TPM chip may also secure other cryptographic keys (and can store passwords) for signing or encryption.

In an example implementation, the target device may generate a TPM key pair (Private K and Public K) and transmit the key (Public K) to the cluster enrollment system 110 along with its Endorsement Key (EK) certificate (Placed into the TPM by the chip manufacturer). In some examples, this process may be performed during device manufacturing. This can be useful, for example, if the target device is activated in an area without direct access to the Internet (e.g., an "airgap facility"). The cluster enrollment system may then verify the EK certificate is issued by a TPM manufacturer and generate credentials for the target device 100 which has public K. For example, after verification of the EK certificate, a certificate for the key pair K may be generated and then the encrypted for the TPMs EK may be encrypted with the TPM public key such that only the owner of the key pair K who has access to the EK on the devices TPM can decrypt the certificate. Alternatively after verification the enrolment system could encrypt object K, the K certificate, and an enrollment token (e.g., Kubernetes discovery token) with the EK public key (and associated public key K) such that only the TPM can decrypt the Kubernetes discovery token. These credentials may then be transmitted to the target device, which may then activate the credentials by sending an encrypted blob to the TPM, which will be decrypted to cause release of the secret if K is loaded on the TPM.

Example Enrollment Criteria

Provided below are several examples of enrollment criteria that may be analyzed by the cluster enrollment system 110 to determine whether the target device 100 is authorized to join the device cluster 105. A cluster enrollment policy may include any combination of the example enrollment criteria discussed herein, variations of these criteria, or additional criteria not specifically described below. In some examples, a cluster enrollment policy indicates an external data source storing an acceptable attribute of a device. For example, a cluster enrollment policy may indicate that an attribute that is retrieved from an external data source must match an attribute of the target device for the target device to be joined to the device cluster 105. The acceptable attribute may be included in the enrollment policy or the cluster enrollment system may communicate with the external data source indicated in the cluster enrollment policy to obtain the acceptable attribute.

In some example implementations, an attribute may be retrieved from the asset management system 140, which may be associated with a manufacturer of devices. A device identifier may include a cryptographic identity stored in secure hardware (e.g., a Trusted Platform Module storing a cryptographic key) and an associated certificate binding the cryptographic identity to a set of properties that are unique to the device (e.g., serial number, MAC address, etc.). Thus, the system 110 can compare the acceptable attributes with the attributes of the target device as part of the device authentication process.

In some example implementations, the cluster enrollment system 110 may query the asset management system 140 for information regarding a device identifier received from the target device 100 and, in return, obtain one or more attributes, such as a platform characteristics, that are usable in conjunction with criteria of the enrollment policy to determine if the target device 100 should be authenticated to join the device cluster 105. In some implementations, the platform characteristics may be provided by the customer that has purchased the target device 100. For example, a customer may provide a binding between a serial number and a particular device cluster, along with a locality criteria of target devices (e.g., using IP address, GPS, or other geolocation coordinates of the target devices).

In some example implementations, an enrollment policy may include a criteria regarding acquisition (e.g., sell or lease) that causes the enrollment system 110 to query a sales data source indicated in the enrollment policy. For example, the device ID from the target device 100 may be used by the cluster enrollment system 110 to query a sales system 135 to determine sales attributes associated with the device ID. For example, if the device ID is not located by the sales system 135, the target device 100 may not be authorized to join the device cluster 105. However, if the device ID is associated with sales attributes matching criteria of the enrollment policy (e.g., the customer matches), the device may be authorized to join the device cluster 105.

In some example implementations, an enrollment policy may include an environmental policy that includes criteria regarding environmental information associated with a target device. The enrollment system 110 may make a request from the target device 100 to provides information to the cluster enrollment system 110 that may be compared with acceptable environmental attributes included in the enrollment policy and/or retrieved from an external data source. For example, environmental criteria may indicate a particular geographic location, IP address range, RF fingerprint, and/or environmental authentication process that may be performed to contribute to an authentication decision. In some implementations, multiple environmental criteria are analyzed to achieve a level of authentication certainty that is sufficient to authenticate the target device 100. For example, a single criteria may not be sufficient to establish a trust level that warrants authentication of the target device 100, but satisfaction of multiple (e.g., some threshold quantity) environmental criteria may increase a trust level and warrant authentication of the target device 100. In some examples, results of testing an individual environmental criteria results in a partial enrollment score (or partial trust score), which may be combined with other partial enrollment scores to determine an overall enrollment score (discussed further with reference to FIG. 3, below). In some examples, certain of the partial enrollment scores may be weighted differently than other partial enrollment scores. One example combination of enrollment criteria may indicate that a device ID of the target device match an acceptable device ID, a GPS location of the target device is within an acceptable geographic location, and a time bounding protocol indicates an acceptable location of the target device, such as by measuring a roundtrip time of a ping from a device within the same subnet as another members of the cluster to the target device, or vice versa.

In some example implementations, an environmental criteria may indicate a locality criteria indicating an acceptable geographic of the target device 100. For example, an IP address of the target device may be used to determine a location of the target device 100 and, if the determined location is within an acceptable area indicated in the locality criteria, may result in a positive (partial) enrollment score. The acceptable physical location of the device may be a specific home, office, factory, geo-fenced area, or any other area. Similarly, other location information, such as may be obtained from a global positioning system sensor of the target device 100, signals from nearby mobile network antennas, etc. may be used to determine if the target device matches the locality criteria and/or to generate partial enrollment scores.

In another example, an ambient noise fingerprint of the target device may be provided to the cluster enrollment system 110 and compared to an acceptable ambient noise fingerprint attribute, such as that may be included in the enrollment policy or retrieved from an external data source. For example, the acceptable ambient noise fingerprint may be based on ambient noise measured by another device that is already in the device cluster 105. The acceptable ambient noise fingerprint attribute may be determined in real time by querying one or more of the devices of the device cluster 105 for their current ambient noise fingerprint.

In another example, an authentication process that involves one or more devices already in the device cluster 105 may be performed by the cluster enrollment system, based on the enrollment policy. For example, in one example, a device of the device cluster that is expected to be within a threshold geographic proximity of the target device 100 may be instructed to play a sound on its speaker. A microphone of the target device 100 may also be accessed to listen for the sound. In one example implementation, the sound is a high-frequency sound or series of sounds (e.g. that may not be detectable by human hearing) that encodes information that is usable to authenticate any devices that can provide the encoded information as being in proximity to be cluster device.

In another example, a distance-bounding protocol may be permed to approximate a distance of the target device 100 from the cluster enrollment system 110. For example, a challenge may be sent by the cluster enrollment system to the target device 100. The challenge is then signed by the target device 100 and sent back to the system 110. The system 110 calculates how long the entire protocol takes and use the round trip time to approximate the distance of the target device 100 to the system 110. A small round trip time generally indicates that the device is closer (or more local).

In another example, a radio frequency fingerprint of the target device may be measured and provided to the cluster enrollment system 110. The RF fingerprint may then be compared to an acceptable radio frequency fingerprint attribute, such as that may be included in the enrollment policy or retrieved from an external data source. For example, the acceptable radio frequency fingerprint attribute may be based on a measured radio frequency fingerprint of another device that is already in the device cluster 105.

In another example, a camera of the target device 100 may be instructed by the cluster enrollment system 110 to acquire one or more images of the ambient environment. The images may then be analyzed by the cluster enrollment system 110 to determine if an acceptable feature or attribute is detected in the image. In some examples, the target device 100 may perform feature extraction and/or some other analysis of an image in its environment and transmit information, rather than an actual image, to the cluster enrollment system 110 for authentication purposes.

In another example, network traffic, such as on a local area network or Wi-Fi network to which the target device is connected, may be analyzed and compared to an acceptable network traffic patterns. A partial authentication score may then be calculated based on how closely the network traffic matches the acceptable network traffic.

In some example implementations, one or more compliance attributes of the target device are determined as part of an enrollment policy. For example, enrollment policy may include compliance information indicating firmware, software, hardware, etc., configuration requirements of the target device before it can be enrolled into the device cluster. These policy criteria may use remote attestation information (e.g., measured by a TPM and certified by a TPM attestation key and associated TCG event log) along with a set of acceptable compliance criteria, which may change over time. In one example implementation, the system 110 retrieves compliance policy information from the enrollment policy, retrieves device configuration from the target device 100 using device self-reporting and attestation protocols, and compares the target device compliance information with the enrollment policy.

Figure 2:
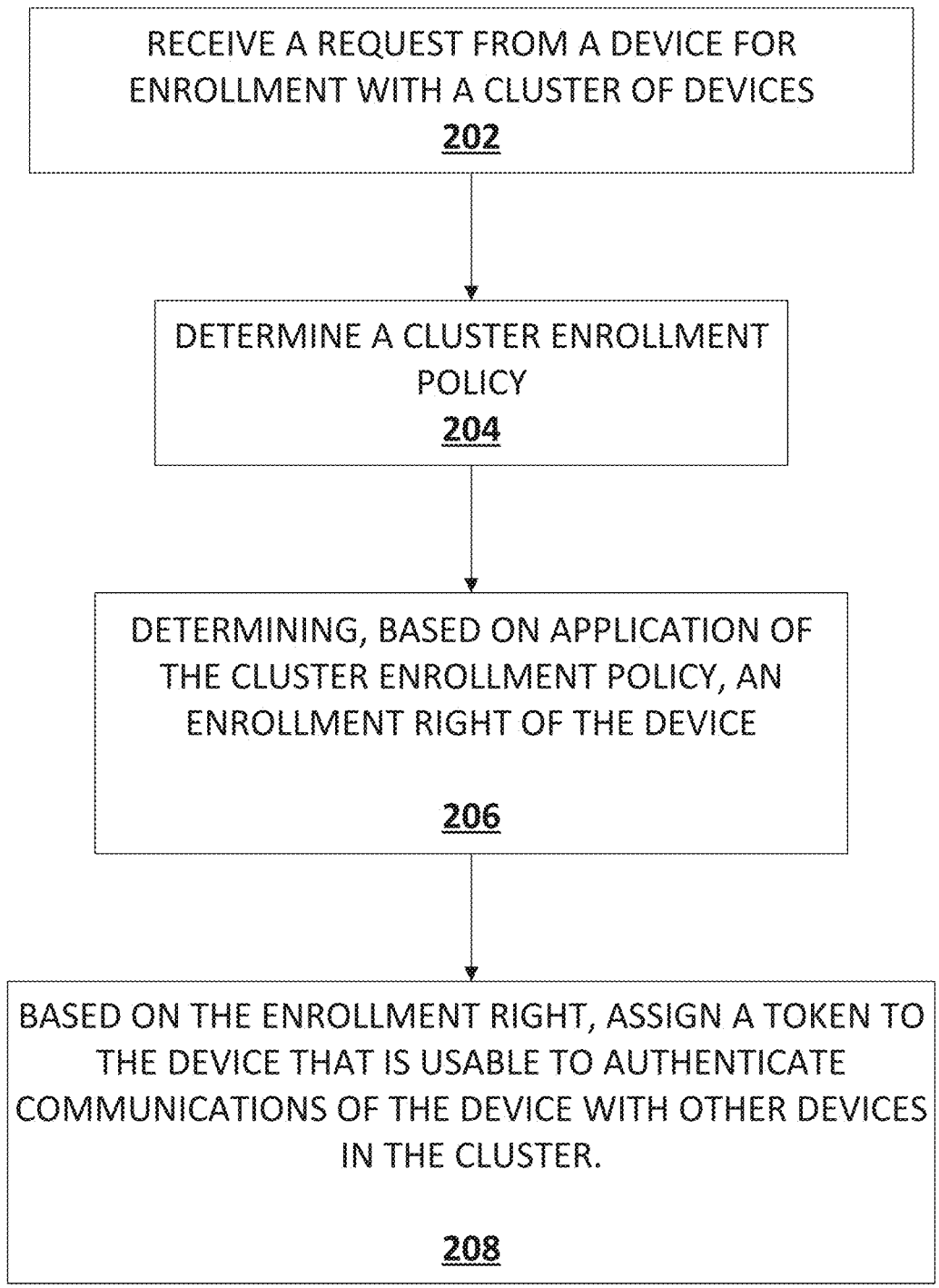
FIG. 2 is a flowchart illustrating one example of an example process of authenticating a target device for enrollment into a device cluster.

FIG. 2 is a flowchart illustrating one example of an example process of authenticating a target device for enrollment into a device cluster. In some examples, the process illustrated in FIG. 2 may be performed by an enrollment system. The example enrollment process may be performed without a requirement for authentication credentials to be manually provided at the device. In some implementations, the enrollment process may enroll a device in a device cluster such that the device is usable for a particular role, task, user group, etc. Depending on the example, the method of FIG. 2 may include fewer or additional blocks and the blocks may be performed in an order that is different than illustrated.

Beginning at block 202, a request from a target device for enrollment with a device cluster is received. For example, a target device (e.g., a server, desktop computer, tablet, mobile phone, etc.) may automatically request enrollment when connected to a network. For example, the target device may authenticate itself with the enrollment system 110 using a device ID (DevID) or Endorsement Key (e.g., identifier can be a serial number which is in the DevID certificate or a DevID can be created as part of enrollment using the association of to an Endorsement Key certificate with the serial number in the Platform Cert). The target device 100 and the cluster enrollment system 110 may then establish a secure communication channel (e.g. encrypted, authenticated, etc.) that is used to perform the authentication process described in the relevant enrollment policy.

Next, at block 204, the enrollment system determines a cluster enrollment policy. As discussed above, a cluster enrollment policy may include criteria indicating characteristics of devices that are allowed to enroll with the network device cluster. In some examples a cluster enrollment policy indicates an overall enrollment score that is required for authentication of the target device, which may be achieved as a result of multiple partial enrollment scores. In some implementations, a device cluster (e.g., of multiple device cluster accessible from the target device location) is determined by the system 110 in response to identifying the target device 100 connected to the network.

At block 206, the enrollment system determines, based on application of the cluster enrollment policy, an enrollment right of the target device. The enrollment right of the target device may be based on application of one or multiple criteria included in the cluster enrollment policy.

At block 208, based on the determined enrollment right (e.g., if an overall enrollment score exceeds an authentication threshold score), the device is provided a token, and/or other authentication credential, that allows access to the device cluster. In some examples, communications within the device cluster may be coordinated using a clustering protocols, such as Kubernetes, Rafay, or the like, where the device cluster includes a primary node that authenticates and coordinates communications with other nodes (e.g., devices) within the device cluster, such as based on a token that is provided by each of the devices to the primary node. In some implementations, automated enrollment of the target device with an existing cluster management system (e.g., Kubernetes, Rafay, etc.) may not require any updates to the configuration of the cluster management system. In some examples, communications within the device cluster may be coordinated via the cluster enrollment system, rather than or in addition to an existing cluster management system. In other examples, communications within the device cluster may be coordinated in other matters.

Figure 3:
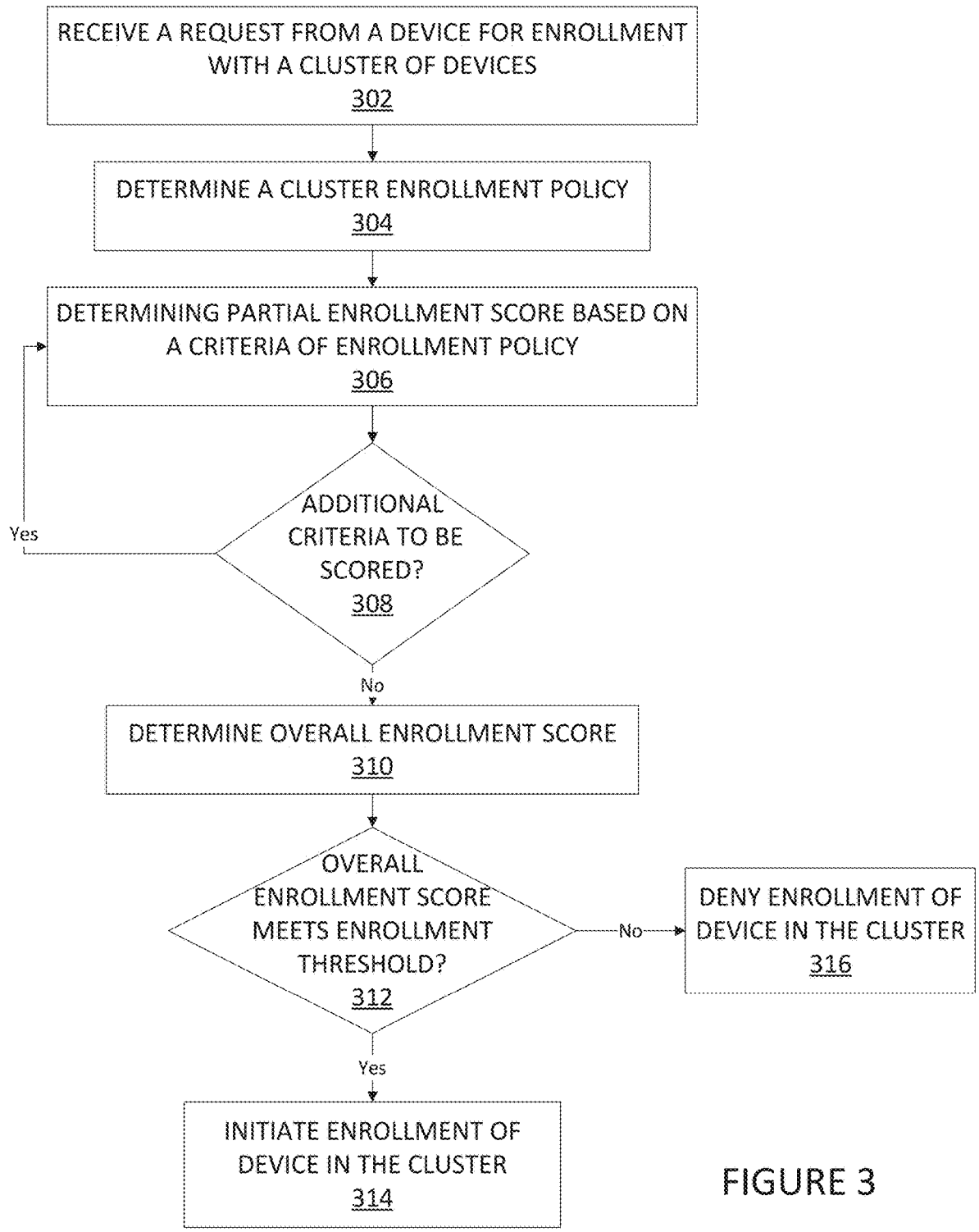
FIG. 3 is a flowchart illustrating one example of an example process of enrolling a device into a device cluster.

FIG. 3 is a flowchart illustrating one example of an example process of enrolling a device into a device cluster. In some examples, the process illustrated in FIG. 3 may be performed by an enrollment system. The example enrollment process may be performed without a requirement for authentication credentials to be provided at the target device. In some implementations, the enrollment process may enroll a device in a device cluster such that the device is usable for a particular role, task, user group, etc. Depending on the example, the method of FIG. 3 may include fewer or additional blocks and the blocks may be performed in an order that is different than illustrated.

Beginning at block 302, an enrollment system receives a request from a device for enrollment with a device cluster. For example, a device (e.g., a server, desktop computer, tablet, mobile phone, etc.) may automatically request enrollment when connected to a network.

Next, at block 304, the enrollment system determines a cluster enrollment policy. As discussed above, a cluster enrollment policy may include criteria indicating attributes of devices that are allowed to enroll with the device cluster. The enrollment policy may be customized by a particular entity, such as the business that purchased the device and/or controls operations of the device cluster, or may be default cluster enrollment policies, such as may be established by the provider of the enrollment system. In some examples, cluster enrollment policies may be updated responsive to results of enrollment of devices in the device cluster. For example, the cluster enrollment policies may be automatically and/or manually updated to include additional criteria and/or to remove current criteria.

Moving to block 306, the enrollment system determines a partial enrollment score based on a first criteria of the enrollment policy. As noted above, an enrollment policy may include multiple types or arrangements of criteria, such as criteria that are associated with an entity (e.g., to confirm the entity that purchased the device), a location (e.g., a geographic location), a configuration (e.g., a particular operating system, hardware specifications, installed software applications, etc.), an environment, and/or other factors that increase the likelihood that the device should be properly joined to the device cluster. In the example of FIG. 3, each of the criteria may be associated with a partial enrollment score that contributes towards an overall enrollment score. In some examples, partial enrollment scores are weighted differently in determination of an overall enrollment score, such as based on relevance of the enrollment criteria towards determining whether the device should be authenticated and enrolled into the network cluster. In some examples, some or all partial enrollment scores are binary (e.g., pass or fail). In some examples, an enrollment policy may include criteria that are alternatively acceptable for authentication. For example, an enrollment policy could indicated that a target device has a known ID (e.g., associated with a purchase by an owner of the cluster), a known hardware configuration, and an IP Address that matches a locality criteria, or that the target device has a known ID (e.g., associated with a purchase by an owner of the cluster) and is collocated in an acceptable location with reference to other cluster members by matching two or more environmental criteria.

Next, at block 308, the enrollment system determines whether additional enrollment criteria need to be scored. If so, the method returns to block 306 where another partial enrollment score based on another criteria of the enrollment policy is determined. Once no further partial enrollment scores are needed, the method continues to block 310 where an overall enrollment score is generated. In some examples, an overall enrollment score may be numerical, such as a sum or a weighted sum of the individual partial enrollment scores. In some examples, an overall enrollment score is an indication of which enrollment criteria are passed and/or which enrollment criteria are failed. In some examples, the overall enrollment score may be any other form.

At block 312, the enrollment system determines whether the overall enrollment score meets an enrollment score threshold, such that the device is authorized to join the device cluster. In some examples, an overall enrollment score may meet an enrollment threshold if a minimum quantity of partial enrollment scores are pass scores. In some examples, an overall enrollment score may meet an enrollment threshold if the numerical enrollment score exceeds a numerical threshold. In other examples, criteria for an overall enrollment score meeting an enrollment threshold may be determined in other manners.

If the overall enrollment score meets the enrollment threshold, the process continues to block 314 where enrollment of the device in the cluster is initiated. For example, in some examples the device is provided a token that is usable for the device to communicate with other devices in the device cluster. If the overall enrollment score does not meet the enrollment threshold, the process continues to block 316 where enrollment of the device in the cluster is denied. In some examples, a message indicating denial of enrollment of the device may be transmitted to the device and/or a cluster administrator, such as with some indication of categories or specific enrollment criteria that failed.

In some implementations, throughout the lifecycle of the device cluster 105, the system 110 may maintain a list of enrolled devices (e.g., enrolled device 115 of FIG. 1) and use the current enrollment policies to confirm that membership of the cluster is still valid. For example, this may involve checking that each cluster member is still in the asset database (e.g. has not been retired), that the hardware associated with the devices is within the enrollment policy (e.g., the enrollment policy may change over time), checking compliance, and/or any other enrollment policies. In some examples, if they device no longer matches the enrollment policy for the cluster, the devices access to the cluster may be suspended or revoked.

Example Implementation Details

It is to be understood that not necessarily all objects or advantages may be achieved in accordance with any particular example described herein. Thus, for example, those skilled in the art will recognize that certain examples may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are stored in memory (e.g., RAM) and are executed by a hardware computer processor of a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the example, certain acts, events, or functions of any of the algorithms described herein can be performed in a different sequence, can be added, merged, or left out altogether (e.g., not all described acts or events are necessary for the practice of the algorithms). Moreover, in certain examples, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, components and modules described in connection with the examples disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another example, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain examples include, while other examples do not include, certain features, elements, blocks and/or steps. Thus, such conditional language is not generally intended to imply that features, elements and/or steps are in any way required for one or more examples or that one or more examples necessarily include logic for deciding, with or without user input or prompting, whether these features, elements, blocks and/or steps are included or are to be performed in any particular example.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the examples described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A non-transitory computer readable medium having software instructions stored thereon, the software instructions executable by a hardware computer processor to cause the hardware computer processor to:
   receive a request from a device for enrollment with a device cluster communicating on a network, wherein the request includes a device identifier;
   authenticate the device based on the device identifier;
   determine a cluster enrollment policy comprising an authentication threshold score, wherein the authentication threshold score indicates a minimum required enrollment score for enrollment of the device with the device cluster;

determine, based on application of the cluster enrollment policy, that an enrollment score of the device exceeds the authentication threshold score;

based on the determination that the enrollment score exceeds the authentication threshold score, assign a token to the device, wherein the token is usable to authenticate communications of the device with other devices in the device cluster; and establish a secure communication channel between a computing system and the device.

2. The non-transitory computer readable medium of claim 1, wherein the cluster enrollment policy indicates an external data source storing acceptable attribute of the device.

3. The non-transitory computer readable medium of claim 2, wherein the software instructions cause the hardware computer processor to:

communicate with the external data source to determine the acceptable attribute of the device; and determine whether the device has the acceptable attribute.

4. The non-transitory computer readable medium of claim 2, wherein the external data source is associated with a manufacturer of the device.

5. The non-transitory computer readable medium of claim 4, wherein the acceptable attribute indicates an entity that purchased the device.

6. The non-transitory computer readable medium of claim 4, wherein the acceptable attribute indicates a serial number of the device and an identifier of the device cluster.

7. The non-transitory computer readable medium of claim 1, wherein the cluster enrollment policy includes an environmental policy including an environmental criteria of the device.

8. The non-transitory computer readable medium of claim 1, wherein the cluster enrollment policy includes a platform policy indicating an acceptable platform attribute.

9. The non-transitory computer readable medium of claim 1, wherein the cluster enrollment policy is associated with the device cluster.

10. The non-transitory computer readable medium of claim 1, wherein a computing system of the device is remote to the device cluster.

11. A non-transitory computer readable medium having software instructions stored thereon, the software instructions executable by a hardware computer processor to cause the hardware computer processor to:

receive a request from a device for enrollment with a device cluster communicating on a network;

authenticate the device based on the device identifier;

determine a cluster enrollment policy comprising an authentication threshold score and a locality criteria, wherein the authentication threshold score indicates a minimum required enrollment score for enrollment of the device with the device cluster;

determine an enrollment score for the device, wherein the enrollment score is based at least in part on the locality criteria indicating an acceptable geographic location of the device;

determine, based on application of the cluster enrollment policy, that the enrollment score of the device exceeds the authentication threshold score;

based on the determination that the enrollment score exceeds the authentication threshold score, assign a token to the device, wherein the token is usable to authenticate communications of the device with other devices in the device cluster; and establish a secure communication channel between a computing system and the device.

12. The non-transitory computer readable medium of claim 11, wherein the locality criteria indicates an acceptable location of the device.

13. The non-transitory computer readable medium of claim 11, wherein a physical location of the device is determined based on an IP address of the device.

14. The non-transitory computer readable medium of claim 11, wherein a physical location indicates a second device expected to be in proximity with the device.

15. The non-transitory computer readable medium of claim 11, wherein a physical location indicates a radio frequency fingerprint.

16. The non-transitory computer readable medium of claim 11, wherein the locality criteria indicates an ambient noise fingerprint.

17. A non-transitory computer readable medium having software instructions stored thereon, the software instructions executable by a hardware computer processor to cause the hardware computer processor to:

receive a request from a device for enrollment with a device cluster communicating on a network;

authenticate the device based on the device identifier;

determine a cluster enrollment policy comprising an authentication threshold score and a platform criterion, wherein the authentication threshold score indicates a minimum required enrollment score for enrollment of the device with the device cluster;

determine an enrollment score for the device, wherein the enrollment score is based at least in part on the platform criterion indicating an acceptable device characteristic of the device;

determine, based on application of the cluster enrollment policy, that the enrollment score of the device exceeds the authentication threshold score;

based on the determination that the enrollment score exceeds the authentication threshold score, assign a token to the device, wherein the token is usable to authenticate communications of the device with other devices in the device cluster; and establish a secure communication channel between a computing system and the device.

18. The non-transitory computer readable medium of claim 17, wherein the software instructions cause the hardware computer processor to:

request platform characteristics from the device; and compare the platform criterion with the platform characteristics.

19. The non-transitory computer readable medium of claim 17, wherein the platform criterion indicates one or more of a hardware, software, or firmware.

* * * * *